United States Patent [19]

Milgram

[11] 4,059,962
[45] Nov. 29, 1977

[54] FLOATING SKIMMING BARRIER ASSEMBLIES

[76] Inventor: Jerome H. Milgram, 23 Mellen St., Cambridge, Mass. 02138

[21] Appl. No.: 730,811

[22] Filed: Oct. 8, 1976

[51] Int. Cl.$^2$ ............................................. E02B 15/04
[52] U.S. Cl. ................................. 61/1 F; 210/DIG. 26
[58] Field of Search .......................... 61/1 F, 1 R, 3–5; 210/242, DIG. 25

[56] References Cited

U.S. PATENT DOCUMENTS

| | | | |
|---|---|---|---|
| 3,476,246 | 11/1969 | Dahan | 210/DIG. 25 |
| 3,701,259 | 10/1972 | Heartness | 61/1 F |
| 3,726,406 | 4/1973 | Damberger | 210/DIG. 25 |
| 3,762,169 | 10/1973 | Graham | 61/1 F |
| 3,847,816 | 11/1974 | DiPerna | 210/DIG. 25 |
| 3,943,720 | 3/1976 | Milgram | 61/1 F |

*Primary Examiner*—Dennis L. Taylor

[57] ABSTRACT

There is disclosed in the present application, a floating skimming barrier assembly for confining oil and removing it from the surface of water. The assembly comprises an elongated flexible sheet supported in a generally vertical position in the water by a plurality of spaced-apart flotation units. The collection of floating oil, which takes place only at certain locations along the length of the barrier is accomplished by skimming panel sub-assemblies attached to the barrier sheet. Each sub-assembly includes an inflated float, a frame upon which there is mounted a tank having a large inlet opening on its inner surface and an outlet conduit connected to the bottom of the tank and leading to a discharge end adapted to being connected to a flexible hose at the surface of the water. The barrier assembly including skimming sub-assemblies and other flotation units at regular intervals is compactly foldable for shipment in a packing case.

7 Claims, 6 Drawing Figures

FLOATING SKIMMING BARRIER ASSEMBLIES

The invention described herein was made in the course of, or under, contract DOT-CG-52959-A with the Department of Transportation.

The present application relates generally to improvements in floating oil barriers and more particularly to such barriers in which a provision is made not only for confining the oil but also for collecting it to be pumped from a body of water.

There has long been a need for apparatus for accomplishing the dual purposes of confining oil spilled on bodies of water and collecting it to be pumped to separation and storage locations, usually aboard boats or ships. The problems of providing such dual purpose apparatus which is also suitable for use in the environment of rough seas is even more challenging. Furthermore, the apparatus must be readily transportable, often by air, relatively light in weight, compact and adapted to withstandiconfining the oil, and a separate oil intake floating in the confined pool and connected to pumps for removing the oil from the confined area. There have also been crude attempts to combine both functions by using slotted hoses floating on the surface of the water and connected to pumps but such expedients have not been very successful offshore since they are not adapted to being employed in rough seas.

It is accordingly an object of the present invention to provide a lightweight skimming barrier assembly especially adapted to the concentration, confinement and removal of oil spills from the surface of rough waters.

A more particular object is to provide a skimming barrier assembly which is so constructed and deployed in the water that it follows the wave motion without allowing the periodic escape of confined oil and without interrupting the collection process for substantial periods of time.

Another object is to provide a skimming barrier assembly which is relatively compact for placement in a container for shipment and yet is sufficiently rugged to withstand the substantial forces encountered in deployment and use.

The foregoing objects are achieved in accordance with the present invention by a barrier assembly including an elongated flexible sheet supported by inflatable floats at regular intervals in a generally vertical position, partly submerged in the water. According to a feature of the invention, some of the floats are parts of skimming sub-assemblies, each of which includes a tank formed with an opening on the inside of the barrier and just above the water level to admit and trap oil to be removed from the tank by pumping. The tank is formed with sloping bottom surfaces which direct the trapped oil to an outlet conduit connecting the tank bottom to a hose connector at the water level.

The foregoing objects and features together with many advantages of the present invention will become more apparent from the following detailed description of an illustrative embodiment taken in connection with the accompanying drawings in which.

Figure 1:
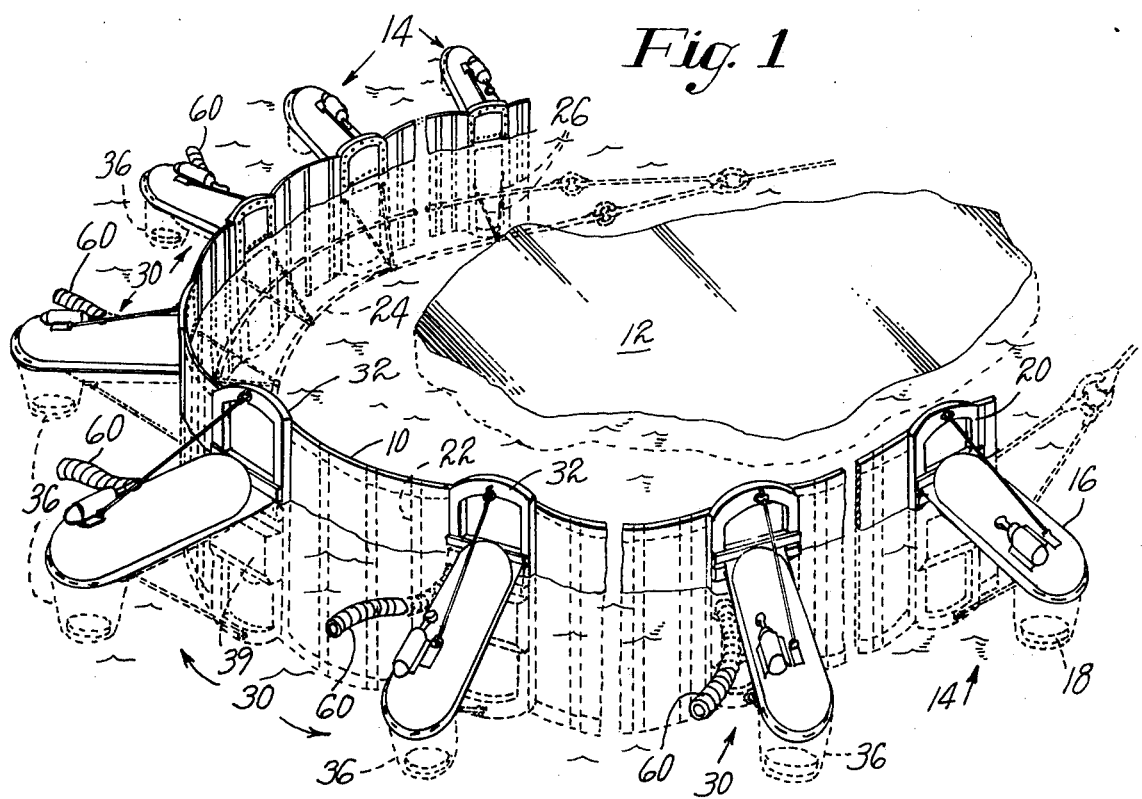
FIG. 1 is a view in perspective of a portion of a floating skimming barrier assembly according to the present invention, shown deployed in a body of water for confining and removing a quantity of floating oil.
Figure 2:
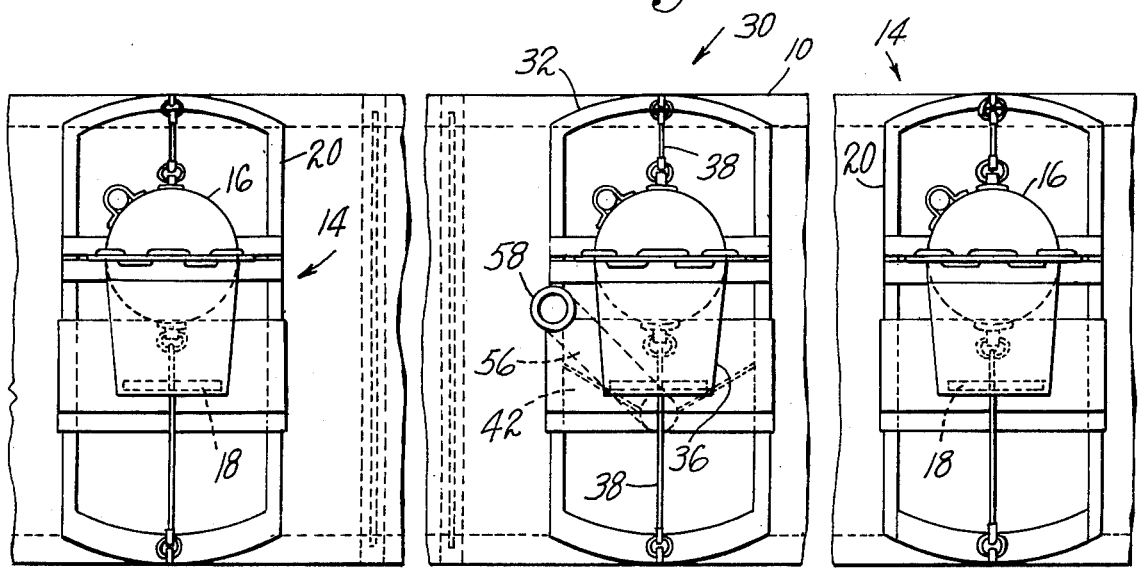
FIG. 2 is a view in rear elevation showing the outside of skimming and flotation sub-assemblies which are parts of the barrier assembly.
Figure 3:
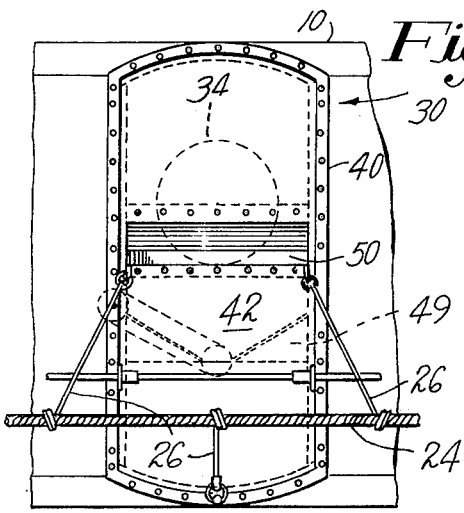
FIG. 3 is a view in front elevation showing the inside of a skimming sub-assembly mounted on a barrier sheet.

Turning now to the drawings, particularly FIG. 1, there is shown a barrier assembly according to the present invention, comprising an elongated flexible sheet 10 of rubber or coated fabric, supported at regular intervals by flotation units and extending partly beneath the surface of the water to concentrate the thickness of a quantity of oil by sweeping and to confine the oil in a pool floating on the surface of a body of water. The flotation units, in those areas of the barrier where no oil is to be collected, are generally of the type disclosed in U.S. Pat. No. 3,943,720 granted to me on Mar. 16, 1976. As in my prior patent, the flotation units which are indicated generally at 14 in FIGS. 1 and 2, each include an inflatable flotation member 16, a counterweight 18 and a rigid frame 20. The flexible sheet 10 is also stiffened to maintain it in upright position by vertical rigid members 22. In addition, as is also seen in the above-identified patent, the present barrier also includes a main tension cable 24 to which each frame 20 is connected by lines 26.

The present barrier includes a plurality of skimming subassemblies each indicated generally at 30. Each sub-assembly 30 includes a rigid outer frame 32 providing a part of the vertical stiffening of the sheet 10 and serving to connect the sheet 10 to an elongated flotation member 34 adapted to float in a horizontal position on the surface of the water and including a counterweight 36 for stability. The frame 32 is maintained in vertical position in the water by a combination of the flotation member 34 connected directly to the frame at its inner end, by the buoyancy of a rigid flotation element 39 and by a sufficiently low center of gravity. The distal end of the flotation member 34 is interconnected for stability with the upper and lower portions of the outer frame 32 by guy lines 38. The outer frame is secured to the sheet 10 by means of a plurality of bolts passing through the frame, the sheet 10 and through an inside frame 40, the sheet being clamped between the two frames. An oil gathering tank 42 is welded to the frame 32 and thus forms an integral part of it. The tank 42 is partially closed at its inner surface by the sheet 10 which is formed with an opening at or slightly above the water line to admit oil from the interior of the barrier which is then trapped in the tank and removed by pumps. The tank 42 is formed with side walls 44, a rear wall 46 and a bottom wall 48 and also contains a pair of partitions 49 which slope downwardly toward the center of the tank. As seen particularly in FIGS. 4 and 5, the whole tank 42 lies outside the sheet 10 and includes in its construction a sloping plate 50 which overlies an opening at the top of the tank and closes an opening 52 in the sheet 10 to the passage of oil and water except to the tank. A grid 54 is mounted inside the tank 42 in the path of liquids entering through the opening 52 to bar the entry of objects which might clog conduits or damage associated pumping apparatus. A conduit 56 leads from the bottom of the tank 42 to a hose connector located above the bottom of the flotation member 34 so as to be at or near the water level, not only to facilitate the connection of a pump hose 60 to the conduit but also in order that the hoses which are designed to float, actually serve to increase the water plane area of the entire assembly and thus aid in stabilizing it to float at varying water levels in waves. This provides an important advantage over either submerged or airborne hoses which do not provide stabilizing buoyancy for wave following.

Although the height of the bottom of the opening 52 in the water varies in accordance with the thickness of the oil layer on the water and with the degree of wave activity, the overall design of the built-in buoyancy of the portion of the barrier affecting the tank 42 is such that the normal or average height of the bottom of the opening is slightly below the water level. When the water is thinly covered with oil, the height of the opening is important since it acts in the manner of a dam or weir allowing a thin layer of oil to pass over the bottom of the opening and to cascade into the tank in which the level is kept low by constant pumping so that the oil is retained in the tank until pumped out.

Figure 4:
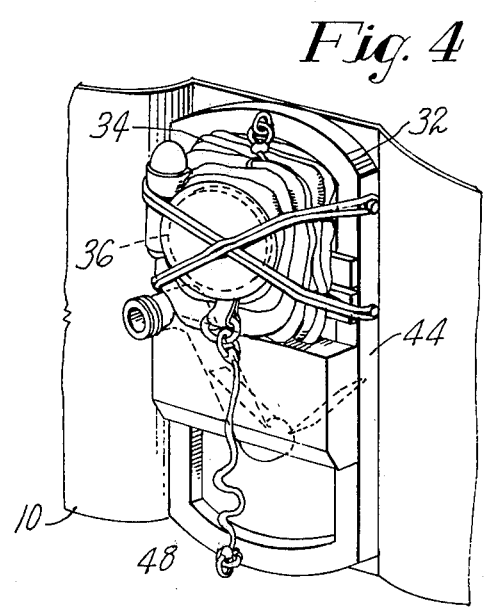
FIG. 4 is a view in perspective showing a skimming sub-assembly in condition ready for shipment.

The manner in which the barrier assembly is packed for shipment wil now be described with particular reference to FIG. 6 in which the interior of a shipping container 66 is represented by a single line. It will first be noted that hose connections to the conduits of the skimming sub-assemblies 30 as shown in FIGS. 1 and 4 are to the left side of the flotation member 34 as seen from the outside of the barrier assembly. However, in order to make more efficient use of the space in the container 66, the skimming subassemblies in practice are both right and left hand in the sense that the outlets are either to the right or left of the flotation unit 34 according to the position which they are to occupy in the container. In describing the positioning of the various portions of the barrier assembly in the container 66, the flotation units are designated by individual reference numerals 68, 70, 72, 74, 76 and 78 in the order of their occurrence along the barrier sheet 10. Following the flotation unit 78 is a set of six skimming sub-assemblies 80, 82, 84, 86, 88 and 90 progressively along the length of the sheet 10. Following the skimming sub-assembly 90, there are shown flotation units 92, 94, 96 and 98.

Figure 6:
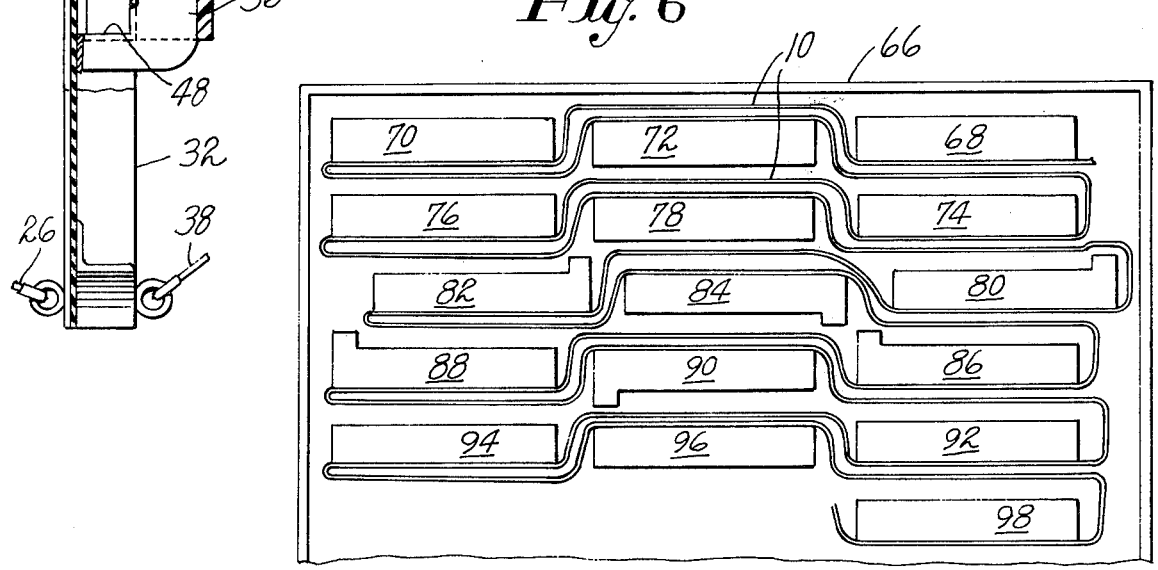
FIG. 6 is a largely schematic view showing the folding of a barrier assembly to pack it for shipment.

The schematic showing of FIG. 6 represents a portion of a complete barrier assembly which may include a plurality of flotation units ahead of the unit 68 and also after the unit 98. In addition, the complete assembly may also include one or more additional sets of skimming sub-assemblies after the interval of flotation units including the units 92, 94, 96 and 98. The number of flotation units and skimming sub-assemblies and the length of the complete barrier assembly are dependent upon several factors such as the size of the oil spill, the prevailing environmental conditions at sea and the equipment available for towing the barrier and for pumping the oil from the skimming sub-assembly tanks.

Figure 5:
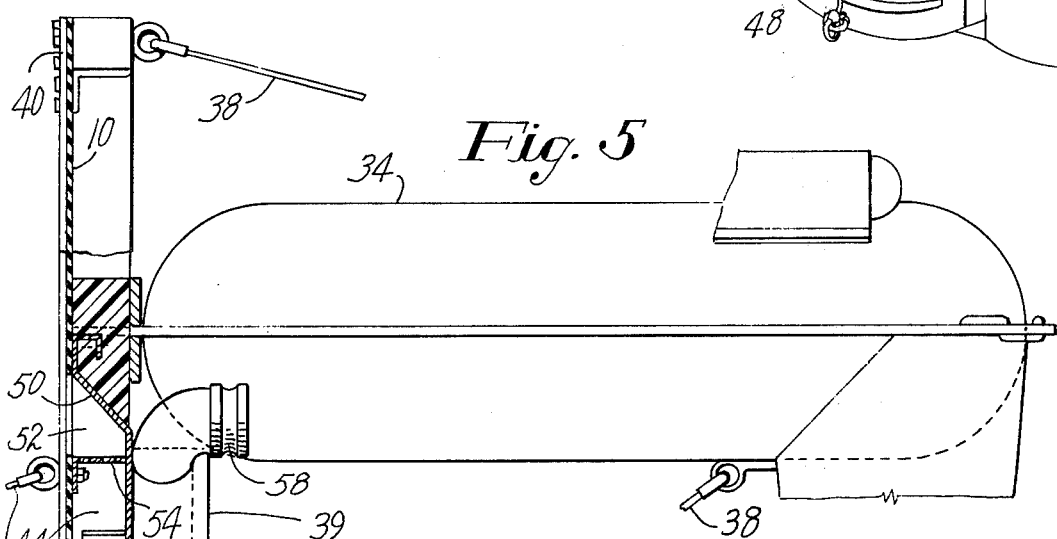
FIG. 5 is a view partly in cross-section depicting the construction details of the skimming sub-assembly of FIG. 3.

Starting with the flotation unit 68, there is a length of sheet 10 between the unit 68 and the unit 70 which are spaced apart in the shipping container but oriented in the same direction. The next unit 72 is inverted and placed at the end of a first bight formed in another section of sheet 10 between the units 68 and 70. From the flotation unit 72, a second bight is formed in the sheet 10 and the flotation units 74 and 76 are positioned adjacent the units 68 and 70 respectively and face in the same direction. After the unit 76, the sheet 10 is again formed into a bight and the unit 78 is positioned between the two units 74 and 76 and adjacent the unit 72 and facing in the same direction as the unit 72. From the unit 78, the sheet 10 which is formed into a bight is connected to a skimming sub-assembly 80 which is a left hand unit offset to the right from the position of the flotation unit 74, a distance slightly greater than the diameter of the connector 58 as also seen in FIG. 5. From the first skimming sub-assembly 80 the sheet 10 connects the second skimming sub-assembly 82, also a left hand unit, which is oriented in the same direction as the sub-assembly 80 and offset to the right of the flotation unit 76. The sheet 10 is doubled on itself after the skimming sub-assembly 82 and is connected to the third skimming sub-assembly 84 which is the first right hand sub-assembly, faces in the opposite direction from the sub-assemblies 80 and 82 and is offset to the right from the flotation unit 78. The first three skimming sub-assemblies 80, 82 and 84 are thus offset to the right respectively from the flotation units 74, 76 and 78. From the skimming unit 84, the sheet 10 is again looped over on itself and connected to the skimming sub-assembly 86 and from there to the sub-assembly 88, which is separated by an extended length of the sheet 10 from the sub-assembly 86, both the sub-assemblies 86 and 88 as well as the sub-assembly 84 being right hand units. The sheet 10 is folded over on itself after the skimming sub-assembly 88 and leads to the sub-assembly 90 a left hand unit placed in line between the sub-assemblies 86 and 88. After the sub-assembly 90, the sheet 10 is again turned over on itself and connected to the first of another succession of flotation units. The first flotation unit 92 is followed by a second unit 94 spaced from the first and after a bight in the sheet by a third unit 96 in a line between the units 92 and 94. Following the unit 94, the sheet 10 is again turned over on itself and connected to another flotation unit 98 and the succession of flotation units and/or skimming sub-assemblies continues as above indicated.

Having thus disclosed my invention, what I claim as new and desire to secure by Letters Patent of the United States is:

1. A skimming sub-assembly for collecting oil floating on water by the motion of a barrier in a forward direction, comprising a two part rigid frame mountable upon an elongated flexible barrier sheet adapted to being supported in a generally upright position and partially submerged in the water, a tank integral with the frame and extending from a level above the water to a bottom substantially below the water level, the tank having an inlet opening near the water level and a conduit extending between the bottom of the tank and an outlet connectible to a suction hose at the water surface.

2. A skimming sub-assembly according to claim 1 further characterized in that the parts of the frame are mounted respectively on inner and outer surfaces of the sheet, that the inlet opening is located at the inner surface of the sheet and the outlet conduit outside the outer surface.

3. A skimming sub-assembly according to claim 2 further comprising an elongated inflatable float connected to the frame and extending horizontally on the surface of the water from the outer surface of the sheet and further characterized in that the conduit includes a connector for a pump hose, at a level slightly above the bottom of the float.

4. A skimming sub-assembly according to claim 2 further characterized in that the tank is an integral part of the outer frame and is formed with an open inner side which is only partially closed by the sheet, leaving the inlet to the tank above the water level.

5. A floating skimming barrier assembly for collecting oil floating on water by the motion of the barrier in a forward direction comprising an elongated flexible sheet, a plurality of flotation units located at spaced-apart intervals along the length of the sheet each including an inflatable float connected to the sheet for maintaining it in generally upright position and partially submerged in the water, the sheet when so disposed in use having inner and outer surfaces, and a skimming sub-assembly comprising a two part frame including members on the inner and outer surfaces of the sheet, a tank integral with the frame and having an inlet opening at the inner surface of the sheet above the water level, a bottom below the water level and an outlet from the tank located at the surface of the water.

6. A floating skimming barrier assembly according to claim 5 further characterized in that the tank is integral with the outer member and is partially closed at its inner side by the sheet leaving the inlet opening.

7. A floating skimming barrier assembly according to claim 5 further comprising a bottom to the tank substantially below the water level and a conduit extending between the tank bottom and a hose connector constituting the outlet.

* * * * *